(12) United States Patent
Rood

(10) Patent No.: X9421
(45) Date of Patent: Feb. 20, 1836

(54) SORES, CURING

(76) Inventor: Reuben Rood

United States Patent Patent No.: X9421

Reuben Reed. Lisle. New York

Letters Patent.

The Schedule referred to in these Letters Patent and making part
of the same containing a description in the words of the said Reuben Reed
himself of his improvement in the composition of matter for curing
fever sores kings evil and most kinds of old sores To all to whom these presents shall come. Be it known
that I Reuben Reed of Lisle in the County of Broome and State
of New York have discovered and invented a new and useful man
ufacture or composition of matter called "wash for curing fever sores
kings evil and most kinds of old sores" and that the following is
a full and exact description of the said manufacture or composi
tion of matter. and the manner in which it should be used. to wit.
Take 2 1/2 drams of blue vitriol. 4 drams of allum. 6 drams of
loaf sugar dissolve them in one pint of good vinegar. add three
table spoonsful of honey and the mixture is fit for use. Keep the
sore clean and wash it twice a day with the above mixture until
completely healed. The sore should be covered with a soft plaster or leaf
to keep the air from it and to keep it moist. If the patient cannot
bear a wash of the strength stated it must be diluted with soft water
until it can be borne without great pain. The strength must be
graduated according to the sensibility of the patient and the pain which
arises always bearing in mind that it should be used of as great
strength as the patient can bear. The wash thus used will effect a
complete cure of the most obdurate cases of fever sore and kings
evil and generally within the period of from one to six months.
It may also be used with great success for old and obstinate sores
of every kind. sore eyes &c. I claim to have discovered that a
combination of the above ingredients in the proportions indicat
ed in the manner stated and the application of the [illegible] as described does and will effect the purpose for which it has been herein before mentioned and explained — Dated October 31st 1835

Witnesses
Geo Park
Isaac Smith

Reuben Hood

Pro Elis (374 words)